United States Patent
Nimura et al.

(10) Patent No.: US 10,606,490 B2
(45) Date of Patent: Mar. 31, 2020

(54) STORAGE CONTROL DEVICE AND STORAGE CONTROL METHOD FOR DETECTING STORAGE DEVICE IN POTENTIAL FAULT STATE

(71) Applicant: FUJITSU LIMITED, Kawasaki-shi, Kanagawa (JP)

(72) Inventors: Koutarou Nimura, Kawasaki (JP); Atsushi Igashira, Yokohama (JP); Yasuhiro Ogasawara, Fujisawa (JP); Marie Abe, Kawasaki (JP); Hiroshi Imamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/039,578

(22) Filed: Jul. 19, 2018

(65) Prior Publication Data
US 2019/0056875 A1 Feb. 21, 2019

(30) Foreign Application Priority Data
Aug. 17, 2017 (JP) .................................. 2017-157531

(51) Int. Cl.
*G06F 3/06* (2006.01)

(52) U.S. Cl.
CPC ............ *G06F 3/0619* (2013.01); *G06F 3/061* (2013.01); *G06F 3/065* (2013.01); *G06F 3/0653* (2013.01); *G06F 3/0659* (2013.01); *G06F 3/0689* (2013.01)

(58) Field of Classification Search
CPC ........ G06F 3/061; G06F 3/0619; G06F 3/065; G06F 3/0653; G06F 3/0659; G06F 3/0689
See application file for complete search history.

(56) References Cited

U.S. PATENT DOCUMENTS

| | | |
|---|---|---|
| 6,636,985 B1 | 10/2003 | Ono et al. |
| 2004/0205381 A1 | 10/2004 | Sakai |
| 2007/0174672 A1 | 7/2007 | Benhase et al. |
| 2008/0109546 A1 | 5/2008 | Yamamoto et al. |
| 2014/0082308 A1* | 3/2014 | Naruse ................. G06F 3/0653 711/158 |
| 2014/0195738 A1* | 7/2014 | Diederich ........... G06F 12/0888 711/130 |

FOREIGN PATENT DOCUMENTS

| | | |
|---|---|---|
| JP | 2001-005616 | 1/2001 |
| JP | 2003-150326 | 5/2003 |
| JP | 2004-252692 | 9/2004 |
| JP | 2005-326935 | 11/2005 |
| JP | 2007-200299 | 8/2007 |

* cited by examiner

*Primary Examiner* — Aracelis Ruiz
(74) *Attorney, Agent, or Firm* — Fujitsu Patent Center

(57) ABSTRACT

A storage control device includes circuitry configured to acquire status information indicating a load status and a response status of each of one or more storage devices from the one or more storage devices which are accessed in response to a request transmitted from a host device, detect a first storage device having a load no more than a first threshold value and a response time no less than a second threshold value from the one or more storage devices on the basis of the acquired status information, and execute redundant copy of the detected first storage device.

13 Claims, 11 Drawing Sheets

FIG. 4

PERFORMANCE INFORMATION TABLE ~220

| RAID GROUP ID | DISK ID | NUMBER OF ISSUED COMMANDS | NUMBER OF COMMANDS WAITING TO BE ISSUED | BUSY RATE | RESPONSE TIME |
|---|---|---|---|---|---|
| G1 | HDD1 | p1 | wp1 | b1 | t1 |
| | HDD2 | p2 | wp2 | b2 | t2 |
| | HDD3 | p3 | wp3 | b3 | t3 |
| | HDD4 | p4 | wp4 | b4 | t4 |
| | HDD5 | p5 | wp5 | b5 | t5 |
| G2 | HDD6 | p6 | wp6 | b6 | t6 |
| | HDD7 | p7 | wp7 | b7 | t7 |
| | HDD8 | p8 | wp8 | b8 | t8 |

| RAID GROUP ID | RAID STATUS | DISK ID | CHECK FLAG |
|---|---|---|---|
| G1 | Available | HDD1 | 0 |
| | | HDD2 | 0 |
| | | HDD3 | 0 |
| | | HDD4 | 0 |
| G2 | Available | HDD5 | 0 |
| | | HDD6 | 0 |
| | | HDD7 | 0 |
| | | HDD8 | 0 |

CONFIGURATION TABLE ~230

500-1, 500-2

STORAGE CONTROL DEVICE AND STORAGE CONTROL METHOD FOR DETECTING STORAGE DEVICE IN POTENTIAL FAULT STATE

CROSS-REFERENCE TO RELATED APPLICATION

This application is based upon and claims the benefit of priority of the prior Japanese Patent Application No. 2017-157531, filed on Aug. 17, 2017, the entire contents of which are incorporated herein by reference.

FIELD

The embodiment discussed herein is related to a storage control technique.

BACKGROUND

In the related art, there is a recovery process called redundant copy. In the redundant copy, a sign of a fault is detected by using statistical point addition processing and the like, and data migration from a suspected disk to an alternate disk (hot spare) is performed in the background.

As a related art, for example, there is a disk array device that deducts points when a failure occurs, deducts points when a command processing time exceeds a processing time reference value, and degenerates defective components when the points fall below a first point reference value. In addition, in a case where a failure of a virtualized storage is detected, there is a technique for investigating the extent of impact due to the failure, specifying a device to be fixed, determining a migration destination device that adapts to attributes such as performance and reliability of the device, and instructing device migration to the virtual storage. Furthermore, in a case where it is determined that an unallocated data storage device may be used to restore a degraded data storage array to best reliability, best performance, and best efficiency, there is a technique of reconfiguring the degraded data storage array to include the unallocated data storage device. Furthermore, in a standby state of the disk storage device not being accessed from a host, there is a technique for performing one of a predetermined test on the functions of the disk storage device, preferably a read test, a write servo test, a write test, or any combination thereof. In addition, there is a technique in which a disk device on a slave side monitors transmission and reception of input and output processing information (event) via a data bus between a disk device on a master device side and a host device, and collects and stores the information in its own device to reproduces the stored event information in its own device.

For example, related technologies are disclosed in Japanese Laid-open Patent Publication No. 2004-252692, Japanese Laid-open Patent Publication No. 2005-326935, Japanese Laid-open Patent Publication No. 2007-200299, Japanese Laid-open Patent Publication No. 2001-5616, and Japanese Laid-open Patent Publication No. 2003-150326.

SUMMARY

According to an aspect of the invention, a storage control device includes circuitry configured to acquire status information indicating a load status and a response status of each of one or more storage devices from the one or more storage devices which are accessed in response to a request transmitted from a host device, detect a first storage device having a load no more than a first threshold value and a response time no less than a second threshold value from the one or more storage devices on the basis of the acquired status information, and execute redundant copy of the detected first storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram illustrating an example of stored contents of a performance information table;

FIG. 5 is an explanatory diagram illustrating an example of stored contents of a configuration table;

DESCRIPTION OF EMBODIMENT

In the related art, it is difficult to find a storage device in a potential fault state in which a response timeout or medium error has not occurred but the operation is slowing down.

Embodiments of a storage control device and a control program according to the present disclosure will be described in detail below with reference to drawings.

Embodiment

Figure 1:
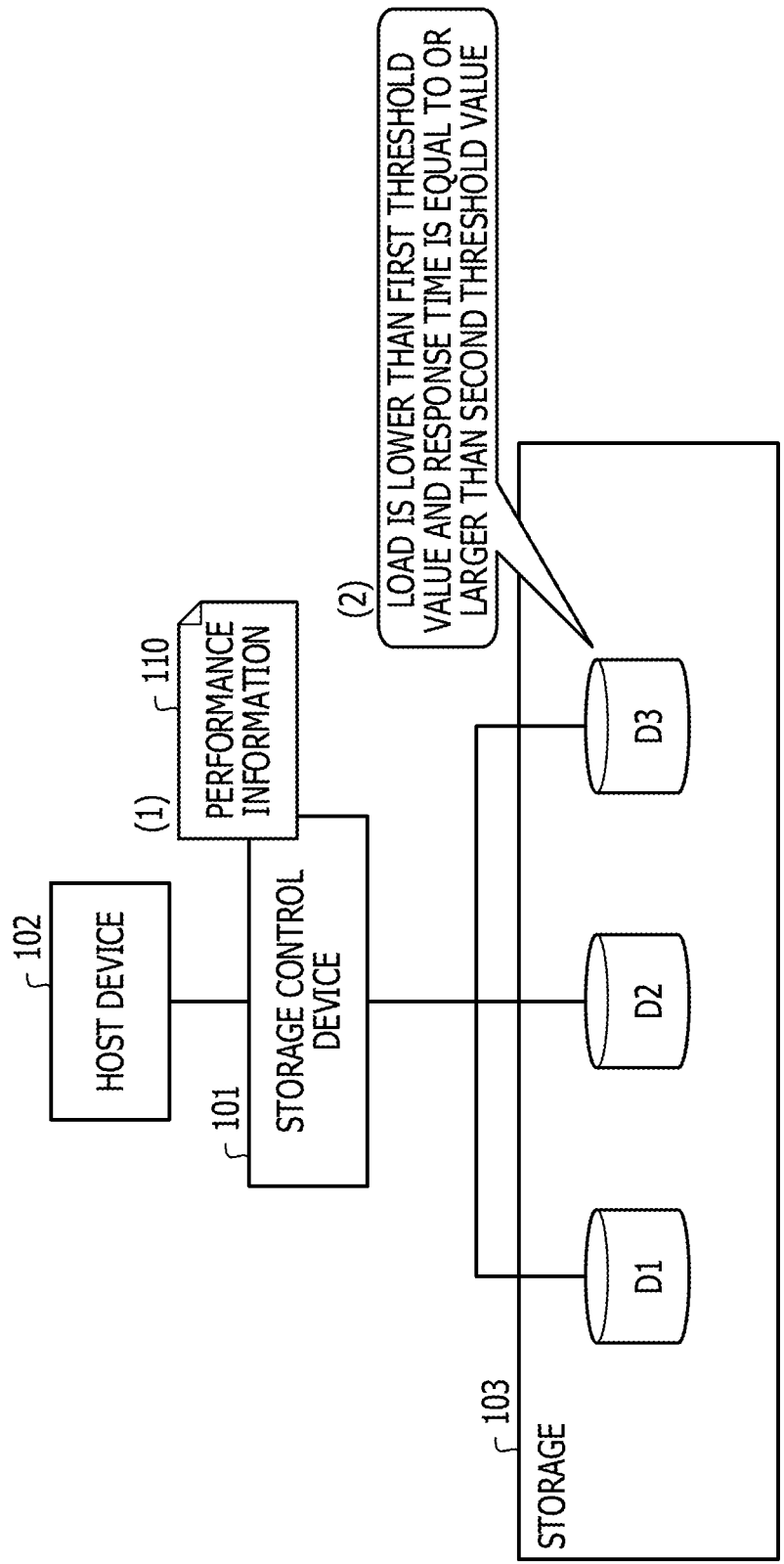
FIG. 1 is an explanatory diagram illustrating an example of a storage control device according to an embodiment.

FIG. 1 is an explanatory diagram illustrating an example of the storage control device 101 according to an embodiment. In FIG. 1, the storage control device 101 is a computer that processes requests from a host device 102 for a storage 103. The host device 102 is a computer that performs information processing and is, for example, a business server that performs business processing. The request to the storage 103 is, for example, an input and output (I/O) request to the storage 103.

The storage 103 includes one or more storage devices D (in the example of FIG. 1, storage devices D1 to D3) that store data. The storage device D is, for example, a hard disk, an optical disk, a flash memory, or the like. For example, the storage control device 101 is applied to a storage device with a redundant arrays of inexpensive disks (RAID) configuration.

Here, redundant copy is available as a recovery process when a sign of a disk fault in the storage device is detected. In the redundant copy, when a sign of a disk fault is detected, data migration from the suspected disk to an alternate disk (hot spare) is performed in the background.

For the detection of the suspected disk, for example, statistical point addition processing is used. The statistical point addition processing is a process of adding points to each disk device (for example, storage device D) every time a response timeout or a medium error occurs and detecting a disk device having statistically added point value exceeding a threshold value within a monitoring period as a suspected disk.

In addition, as a function of periodically diagnosing disk devices in a storage device, there is a process called patrol diagnosis processing. In the patrol diagnosis processing, an I/O command for inputting/outputting data is issued to all disk devices (including hot spares) asynchronously with the I/O request from the host (for example, the host device 102) to perform fault diagnosis.

The main purpose of the patrol diagnosis processing is to avoid data loss and data corruption due to double faults by detecting a disk device error early and disconnecting the faulty disk. However, patrol diagnosis processing takes time. For example, in the case of a disk of 4 [TB], it takes about two weeks to diagnose the entire area in the disk. In addition, even in the patrol diagnosis processing, for example, statistical point addition processing is used for detection of a suspected disk.

However, in the statistical point addition processing, only errors with high severity such as response timeout and media errors are subject to statistical point addition processing. Therefore, in the statistical point addition processing, it is difficult to discover a disk device in a potential fault state (target of replacement to avoid a fault) in which the operation is slowing down although no response timeout or medium error has occurred.

For example, the response to the access to the disk device in response to the I/O request from the host usually ends in several milliseconds, but it may take several tens to several hundreds of milliseconds. If it takes about several seconds (for example, 5 seconds or more), the disk is to be subjected to the statistical point addition, but if it takes several tens to hundreds of milliseconds (for example, less than 5 seconds), the disk is not subject to the statistical point addition. However, even if there is a delay that does not cause a statistical point addition (for example, a delay of less than 5 seconds), if the delay happens on a daily basis, the disk device will be slowing down and cause degradation in response performance to the host.

Factors that put the disk device in a potential fault state include aged deterioration of the disk device, damage due to external factors, minute dust on the disk, rut of lubricant oil, and the like. For example, in a case where reading fails due to minute dust on the disk and a retry operation occurs, if reading may finally succeed, a response timeout or medium error does not occur, but response may take time.

In order to detect a slowed-down disk device, it may be considered to make strict conditions for an event to be subjected to statistical point addition. For example, it is also possible to detect a delay that causes a slowdown as an error by setting a threshold value for detecting a delay error low. However, it is impossible to distinguish between response degradation caused by a busy state due to access contention and response degradation caused by a potential fault state only by lowering the threshold value for detecting an error.

Therefore, in this embodiment, a description is given of the storage control device 101 that detects the storage device D slowing down in a potential fault state in which a response timeout or a medium error has not occurred. A processing example of the storage control device 101 will be described below.

(1) The storage control device 101 acquires performance information indicating a load status and a response status of one or each of a plurality of storage devices D accessed in response to an I/O request from the host device 102. Here, the load status of the storage device D represents a load imposed on access and is represented by, for example, a busy rate. The busy rate is an index value (unit: %) indicating the load status of the storage device D in a predetermined period (for example, the most recent one hour).

In addition, the response status of the storage device D is represented by a response time from when an access command is issued to the storage device D until a response is received (unit: second). In the example of FIG. 1, performance information 110 indicating the load status and the response status of each of the storage devices D1 to D3 in the storage 103 is acquired.

(2) Based on the acquired performance information, the storage control device 101 detects the storage device D having load lower than a first threshold value and the response time equal to or larger than a second threshold value from one or each of a plurality of storage devices D. Here, the first and second threshold values may be randomly set.

The first threshold value is set to a value at which the storage device D may be determined to be in a high load status when the load of the storage device D is equal to or larger than the first threshold value. The high load status is, for example, a busy state due to access contention. More specifically, for example, when the load status of the storage device D is represented by the busy rate, the first threshold value is set to a value of about 50%.

The second threshold value is lower than a timeout value for the storage device D. The timeout value is a value (response time) for determining the response timeout (I/O timeout). Specifically, for example, the second threshold value is lower than a value for determining the response timeout in the statistical point addition processing and the patrol diagnosis processing for the storage device D. As an example, in a case where the value for determining the response timeout is "5 seconds", the second threshold value is set to a value of about 2 seconds, for example.

In the example of FIG. 1, based on the acquired performance information 110, the storage control device 101 detects the storage device D having the load lower than the first threshold value and the response time equal to or larger than the second threshold value among the storage devices D1 to D3 in the storage 103. Here, it is assumed that, among the storage devices D1 to D3, the load of the storage device D3 is lower than the first threshold value and the response time of the storage device D3 is equal to or larger than the second threshold value. In this case, the storage device D3 is detected.

As described above, according to the storage control device 101, it is possible to detect the storage device D having the load lower than the first threshold value and the response time equal to or larger than the second threshold value from the one or each of the plurality of storage devices D accessed in response to the I/O request from the host device 102. As a result, although a response timeout or medium error has not occurred, it is possible to discover the storage device D slowing down in a potential fault state at an early stage. In addition, it is possible to avoid erroneous detection of the storage device D having degraded response due to the busy state as the storage device D in a potential fault state.

In the example of FIG. 1, the storage device D3 is detected as the storage device D in a potential fault state. Therefore, it is possible to disconnect the storage device D3 that has a malfunction that affects operation due to subtle defects that may not be detected by statistical point addition processing by executing redundant copy on the storage device D3. As a result, it is possible to suppress the degradation of the response performance of the entire storage 103 due to the influence of the performance degradation of the storage device D3 in a potential fault state.

System Configuration Example of Storage System 200

Next, a case where the storage control device 101 illustrated in FIG. 1 is applied to the storage system 200 will be described. The storage system 200 is, for example, a redundant system such as RAID 5 or 6.

Figure 2:
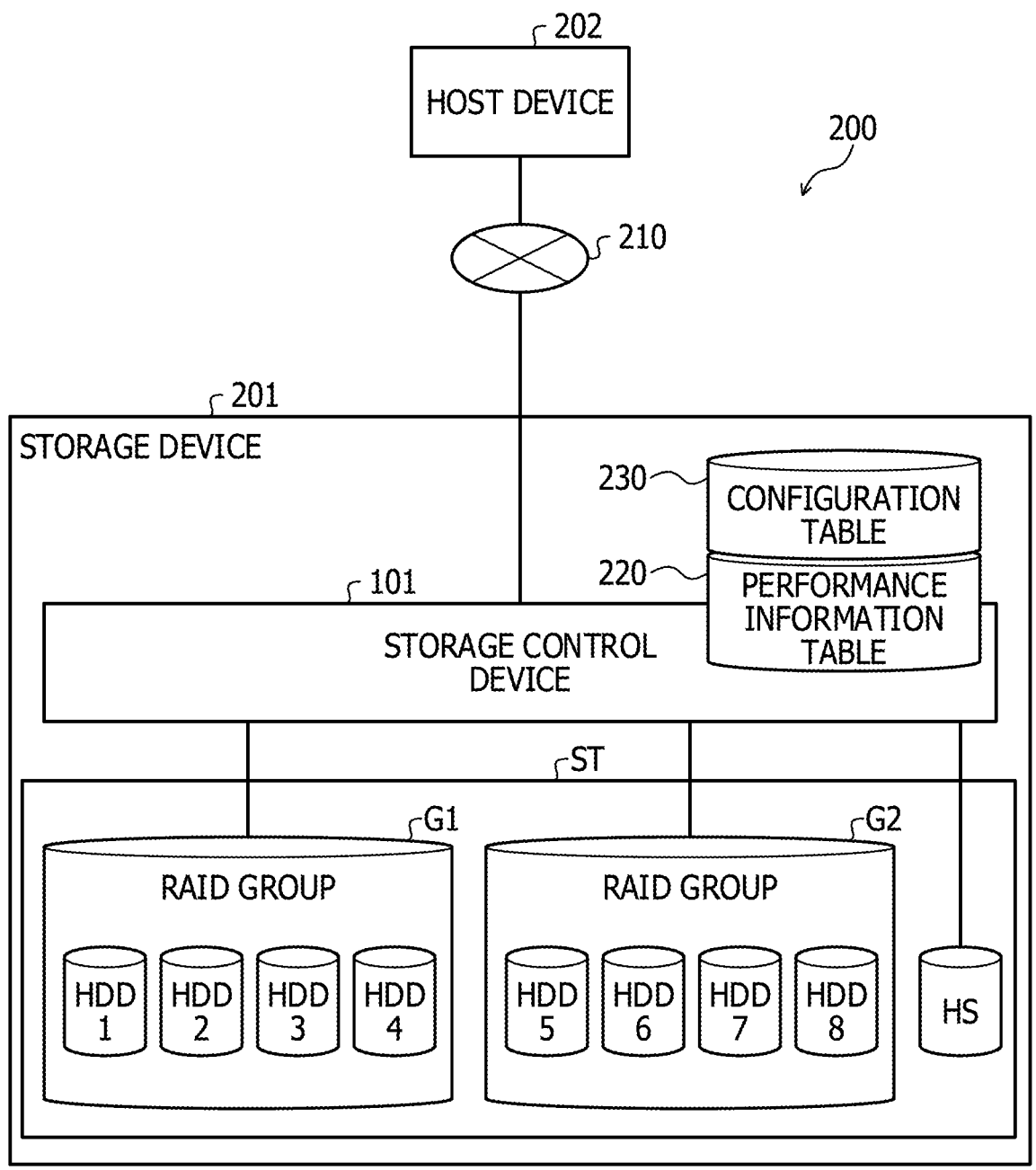
FIG. 2 is an explanatory diagram illustrating a system configuration example of a storage system.

FIG. 2 is an explanatory diagram illustrating a system configuration example of the storage system 200. In FIG. 2, the storage system 200 includes a storage device 201 and a host device 202. In the storage system 200, the storage device 201 and the host device 202 are connected via a wired or wireless network 210. The network 210 is, for example, a local area network (LAN), a wide area network (WAN), the Internet, or the like.

The storage device 201 includes a storage control device 101 and a storage ST. The storage ST includes a plurality of hard disk drives (HDDs). However, instead of an HDD, a solid-state drive (SSD) may be used. The storage ST includes one or more hot spares HS. The hot spare HS is an alternative HDD.

In the storage ST, for example, a RAID group is created from one or more HDDs. In the example of FIG. 2, a RAID group G1 is created from HDDs 1 to 4. A RAID group G2 is created from HDDs 5 to 8. The storage 103 illustrated in FIG. 1, for example, corresponds to the storage ST.

The storage control device 101 is capable of accessing each HDD in the storage ST and processes an I/O request for the storage ST from the host device 202. The storage control device 101 has configuration information and allocation information (not illustrated). In the configuration information, for example, various kinds of management information on the logical volumes created in the storage system 200 and the disks constituting the RAID group are stored. For example, the allocation information stores information for each allocation unit (chunk) in a thin provisioning configuration and correspondence information between logical addresses and physical addresses for allocated chunks.

In addition, the storage control device 101 has a performance information table 220 and a configuration table 230. The stored contents of the performance information table 220 and the configuration table 230 will be described later with reference to FIGS. 4 and 5. In the storage system 200, the storage control device 101 and the host device 202 are connected by fibre channel (FC) or internet small computer system interface (iSCSI), for example.

The host device 202 is a computer that makes an I/O request to the storage ST. Specifically, for example, the host device 202 requests a read/write of data from and to a logical volume provided by the storage system 200. For example, the host device 202 is a business server that uses the storage system 200. The host device 102 illustrated in FIG. 1, for example, corresponds to the host device 202.

In the example of FIG. 2, only one storage control device 101 and one host device 202 are illustrated, but the storage system 200 may include a plurality of storage control devices 101 and host devices 202. In addition, in the example of FIG. 2, the RAID groups G1 and G2 are created in the storage ST, but one or three or more RAID groups may be created.

Hardware Configuration Example of Storage Control Device 101

Figure 3:
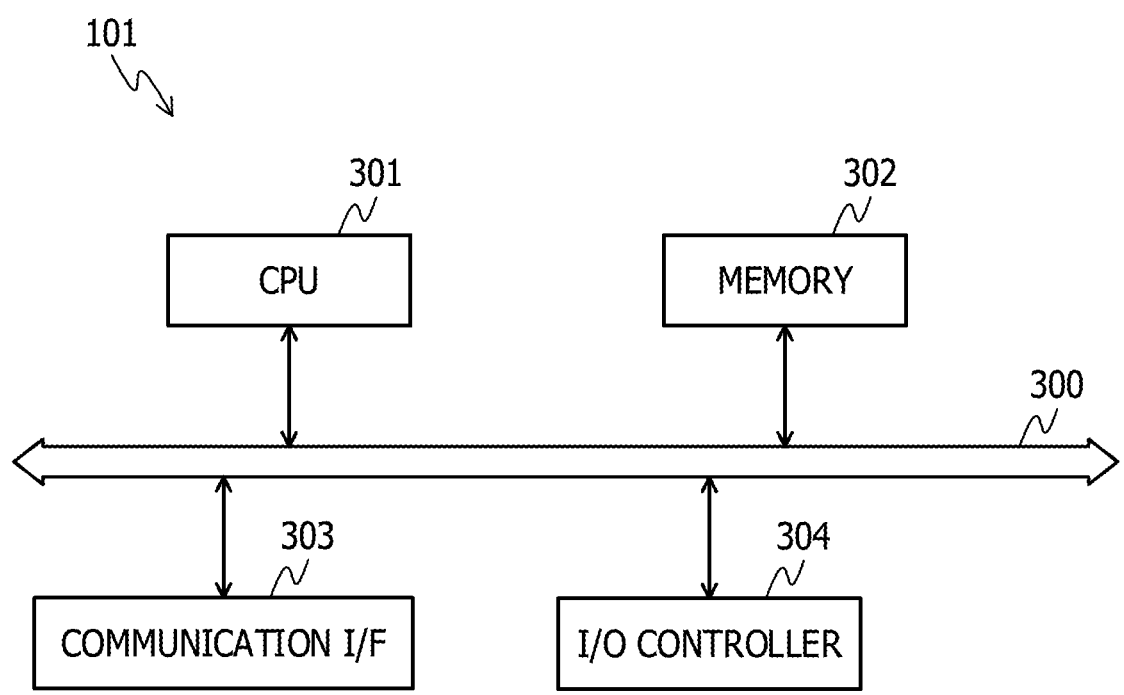
FIG. 3 is a block diagram illustrating an example of a hardware configuration of the storage control device.

FIG. 3 is a block diagram illustrating an example of a hardware configuration of the storage control device 101. In FIG. 3, the storage control device 101 includes a central processing unit (CPU) 301 as a processor, a memory 302, a communication interface (I/F) 303, and an I/O controller 304. In addition, each component is connected by a bus 300.

Here, the CPU 301 governs the overall control of the storage control device 101. The memory 302 includes, for example, a read-only memory (ROM), a random-access memory (RAM), a flash ROM, and the like. More specifically, for example, a flash ROM or ROM stores various programs, and the RAM is used as a work area of the CPU 301. The program stored in the memory 302 is loaded into the CPU 301 to cause the CPU 301 to execute coded processing.

The communication I/F 303 is connected to the network 210 via a communication line and is connected to an external device (for example, the host device 202 illustrated in FIG. 2) via the network 210. The communication I/F 303 controls the interface between the network 210 and the inside of the device and controls the input and output of data from the external device. The I/O controller 304 accesses the storage ST (see FIG. 2) under the control of the CPU 301.

Stored Contents of Performance Information Table 220

Next, the contents stored in the performance information table 220 of the storage control device 101 will be described. The performance information table 220 is realized by the memory 302 illustrated in FIG. 3, for example.

FIG. 4 is an explanatory diagram illustrating an example of stored contents of the performance information table 220. In FIG. 4, the performance information table 220 has fields of a RAID group ID, a disk ID, the number of issued commands, the number of commands waiting to be issued, a busy rate, and a response time. Performance information 400-1 to 400-8 is stored as a record by setting information in each field.

Here, the RAID group ID is an identifier for uniquely identifying the RAID group in the storage ST (see FIG. 2). The disk ID is an identifier for uniquely identifying the HDD (disk device) in the RAID group identified by the RAID group ID. Number of commands issued (Que-in-proq is the number of access commands (write command and read command) being issued to the HDD identified by the disk ID. The upper limit value of the number of issued commands is, for example, 30.

The number of commands waiting to be issued (Que-wait) is the number of access commands waiting to be issued to the HDD. Priorities are set for access commands. As a priority, for example, any one of High, Normal, and Low is set. The priority becomes higher in the order of "Low→Normal→High". Access commands with a higher priority are processed with a higher priority.

The busy rate is an index value indicating an HDD load status in the most recent one hour (unit: %). For example, the busy rate is calculated in consideration of the number of commands waiting to be issued to the HDD and the processing capacity (such as rotation speed) of the HDD. For example, the case where the busy rate is 0% indicates that there is no access to the HDD in the most recent hour. The case where the busy rate is less than 50% indicates that the load status of access to the HDD in the most recent one hour is a normal state. The case where the busy rate is 50% or more indicates that the load status of access to the HDD in the most recent one hour is a high load status.

The response time is the response time (unit: second) from when an access command is issued to the HDD until a response is received. For example, the response time may be the response time for the most recent access command or may be the average of the response times for access commands for several minutes in the past.

The performance information table 220 may hold the number of issued commands, the number of commands waiting to be issued, and the priorities of access commands for the most recent several access commands (for example, 3 times of commands). The performance information table 220 is updated, for example, periodically or at a predetermined timing. The predetermined timing is, for example, a timing at which an I/O request from the host device 202 is processed or a timing at which a diagnostic command to be described later is executed.

Stored Contents of Configuration Table 230

Next, the stored contents of the configuration table 230 of the storage control device 101 will be described. The configuration table 230 is realized by the memory 302 illustrated in FIG. 3, for example.

FIG. 5 is an explanatory diagram illustrating an example of stored contents of the configuration table 230. In FIG. 5, the configuration table 230 has fields of a RAID group ID, a RAID status, a disk ID, and a check flag and stores configuration information 500-1 and 500-2 as a record by setting information in each field.

Here, the RAID group ID is an identifier for uniquely identifying the RAID group in the storage ST (see FIG. 2). The RAID status indicates the status of the RAID group identified by the RAID group ID. As the RAID status, for example, any one of Available, Rebuild, and Exposed is set. The RAID status "Available" indicates a state in which there is data redundancy. The RAID status "Rebuild" indicates a state in which data redundancy is being restored. The RAID status "Exposed" indicates a state in which there is no data redundancy.

The disk ID is an identifier for uniquely identifying an HDD in the RAID group. The check flag indicates whether or not the HDD is a diagnosis target. The diagnosis target is an HDD to be processed by new diagnosis processing to be described later. The check flag "0" indicates that the HDD is a diagnosis target. The check flag "1" indicates that the HDD is not a diagnosis target. The check flag is "0" in an initial state.

Functional Configuration Example of Storage Control Device 101

Figure 6:
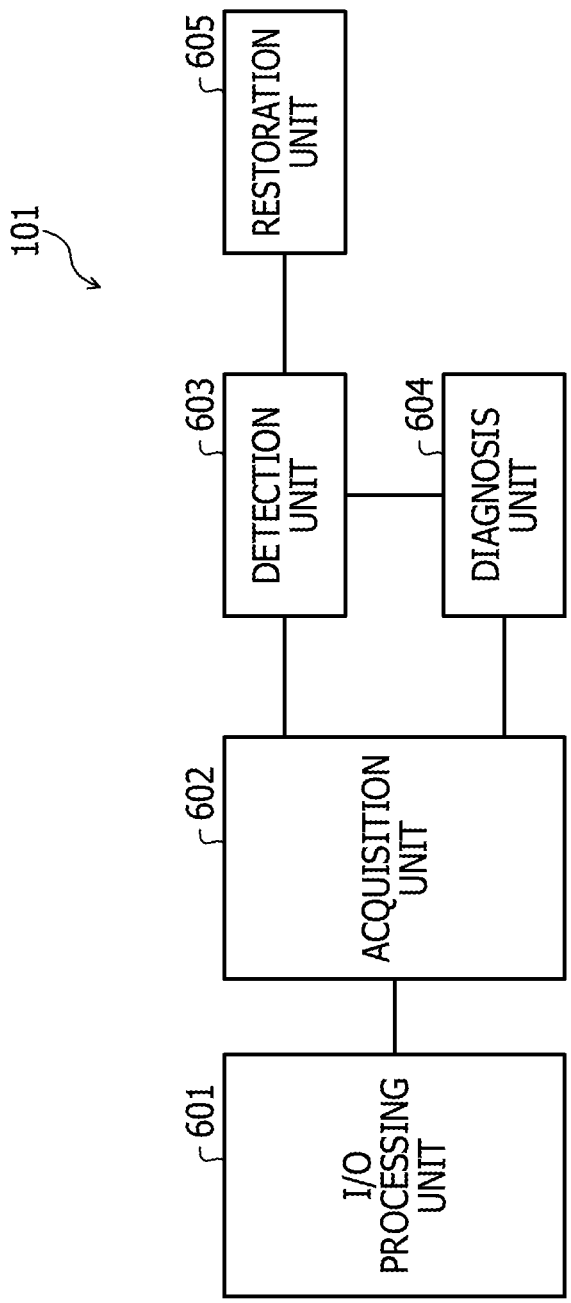
FIG. 6 is a block diagram illustrating a functional configuration example of the storage control device.

FIG. 6 is a block diagram illustrating a functional configuration example of the storage control device 101. In FIG. 6, the storage control device 101 includes an I/O processing unit 601, an acquisition unit 602, a detection unit 603, a diagnosis unit 604, and a restoration unit 605. The I/O processing unit 601 to the restoration unit 605 are functions serving as a control unit, and specifically, for example, realizes the functions by causing the CPU 301 to execute the program stored in the memory 302 illustrated in FIG. 3, or by the communication I/F 303 and the I/O controller 304. The processing result of each functional unit is stored in the memory 302, for example.

The I/O processing unit 601 processes an I/O request to the storage ST from the host device 202. The I/O request is a write request or a read request. The write request is, for example, a request to write data to the logical volume provided by the storage system 200. The read request, for example, requests reading of data from the logical volume.

Specifically, for example, in response to the I/O request from the host device 202, the I/O processing unit 601 issues an access command to the HDD in the RAID group and receives a response command for the access command. The access command is a read command or a write command.

In addition, the I/O processing unit 601 responds to the I/O request from the host device 202. Specifically, for example, the I/O processing unit 601 notifies the host device 202 of a write completion response to a write request from the host device 202 or read data for a read request.

The acquisition unit 602 acquires the performance information representing the load status and the response status of the HDD in the storage ST. Here, the load status of the HDD represents the load on the access and is represented by a busy rate, for example. The response status of the HDD is represented by, for example, a response time from when an access command is issued to the HDD until a response is received.

Specifically, for example, in response to the processing of the I/O request from the host device 202, the acquisition unit 602 acquires the performance information indicating the load status and the response status of each HDD in the storage ST. More specifically, for example, the acquisition unit 602 may acquire the performance information representing the load status of the HDD by calculating the busy rate in consideration of the number of issued commands to the HDD and the processing capability (such as rotation speed) of the HDD.

In addition, the acquisition unit 602 may acquire the performance information indicating the response status of the HDD by measuring the response time from when the access command is issued to the HDD until a response is received. At this time, the acquisition unit 602 may measure the response time of the entire RAID group. Between the HDDs in the RAID group, there is a variation in the time from when an access command is issued until a response is received. The response time of the entire RAID group corresponds to the time from when an access command is issued to the HDD in the RAID group until the latest response is received.

The acquired performance information is stored in the performance information table 220 illustrated in FIG. 4, for example. As a result, the storage control device 101 may monitor the load status and the response status of the HDD in the RAID group accessed in response to the I/O request from the host device 202.

The detection unit 603 detects a potentially faulty disk. Here, the potentially faulty disk is a HDD in a potential fault state. Specifically, for example, the detection unit 603 detects an HDD having the load lower than a threshold value $\alpha$ and the response time equal to or larger than a threshold value $\beta$ as a potentially faulty disk based on the performance information acquired by the acquisition unit 602 from the HDDs in the storage ST.

Here, the threshold value $\alpha$ and the threshold value $\beta$ may be randomly set. When the load of the HDD becomes equal to or larger than the threshold value $\alpha$, the threshold value $\alpha$ is set to a value at which the HDD may be determined under a high load (busy state). For example, when the load status of the HDD is represented by the busy rate, the threshold value $\alpha$ is set to a value of about 50%. The threshold value $\alpha$ corresponds to the "first threshold value" described in FIG. 1.

The threshold value $\beta$ is a value lower than the value for determining the response timeout in the statistical point addition processing or the patrol diagnosis processing for the HDD. For example, in a case where the value for determining the response timeout of the HDD is "5 seconds", the threshold value β is set to a value of about 2 seconds. The threshold value β corresponds to the "second threshold value" described in FIG. 1.

More specifically, for example, the detection unit 603 refers to the performance information table 220 to detect HDDs having the busy rate lower than the threshold value α and the response time equal to or larger than the threshold value β as a potentially faulty disk from the HDDs in the RAID group. The RAID group is, for example, a RAID group accessed in response to an I/O request from the host device 202.

As an example, the threshold value α is set to "50%", and the threshold value β is set to "2 seconds". In addition, a busy rate b1 of an HDD 1 at the time of access to the RAID group G1 in response to the I/O request from the host device 202 is set to "30%", and a response time t1 is set to "2.2 seconds". In this case, since the busy rate b1 of the HDD 1 is lower than the threshold value α and the response time t1 of the HDD 1 is equal to or larger than the threshold value β, the detection unit 603 detects the HDD 1 as a potentially faulty disk. In addition, a busy rate b2 of an HDD 2 is "60%", and a response time t2 is "3.2 seconds". In this case, although the response time t2 of the HDD 2 is equal to or larger than the threshold value β, the detection unit 603 does not detect the HDD 2 as a potentially faulty disk because the busy rate b2 of the HDD 2 is equal to or larger than the threshold value α. That is, it is determined that the response of the HDD 2 is degraded due to a busy state.

However, even when there is an access the RAID group, an access to some of the HDDs in the RAID group may not occur. For example, in RAID 5, data is distributed and stored in the HDDs in the RAID group. However, in the case of data with a small data size, for example, HDDs that do not store divided data or parity data, that is, there may be HDDs that are not accessed. Such an event is more likely to occur as the number of HDDs in the RAID group increases.

In addition, depending on the access tendency of the host device 202, there may be RAID groups that are not accessed at all for a certain period. Therefore, depending on the performance measured in response to the I/O request from the host device 202, it may not be possible to determine the HDD in a potential fault state.

Therefore, the storage control device 101 extracts an HDD to be determined as not being accessed among the HDDs in the storage ST as a diagnosis target disk, performs dummy access to the diagnosis target disk, and performs performance diagnosis. In the following description, the diagnosis processing for the diagnosis target disks is sometimes referred to as "new diagnosis processing" in order to distinguish from the existing patrol diagnosis processing.

Based on the acquired performance information, the diagnosis unit 604 extracts diagnosis target disks from the HDDs in the storage ST. Here, the diagnosis target disk is an HDD determined as not accessed. Specifically, for example, the diagnosis unit 604 refers to the performance information table 220 to determine that the HDD having 0% busy rate among the HDDs in the storage ST is an HDD not accessed. Then, the diagnosis unit 604 extracts an HDD that is determined as not being accessed as a diagnosis target disk. However, the diagnosis unit 604 may determine the HDD having the busy rate equal to or less than a predetermined value (for example, 5% or less) among the HDDs in the storage ST as an HDD not accessed.

As an example, if a busy rate b4 of an HDD 4 is set to "0%", the diagnosis unit 604 extracts the HDD 4 having 0% busy rate as a diagnosis target disk. "1" is set to the check flag of the HDD which is not extracted as a diagnosis target disk in the configuration table 230 (see FIG. 5).

In addition, the diagnosis unit 604 measures a response time when a specified amount of access commands are issued to the extracted diagnosis target disk so that the load does not exceed the threshold value α. Here, the specified amount of access commands are access commands for applying a moderate load to the HDD so that the disk is not to be in a high load status and is set as appropriate according to the performance of the HDD. The moderate load is, for example, a load with a busy rate of about 40%. The specified amount of access commands is specified, for example, by the number of issued commands.

As an example, it is assumed that the number of issued commands with a busy rate of 40% is "30". In this case, for example, the diagnosis unit 604 issues read/write commands to the diagnosis target disk so as to maintain the number of issued commands "30" asynchronously with the I/O request from the host device 202. The read/write command is a diagnostic command for writing back the read data as it is. In accordance with the execution of the diagnostic command, the performance information of the diagnosis target disk in the performance information table 220 is updated.

In addition, in a case where the patrol diagnosis processing is being executed, the diagnosis unit 604 may select an area other than the patrol diagnosed area as a diagnosis area from the diagnosis target disks. Then, the diagnosis unit 604 may randomly access the selected diagnosis area by the diagnostic command so that the range in which a read/write is performed is not biased.

In addition, although the diagnosis target HDD is an HDD determined as not being accessed, there is a possibility that the diagnostic command conflicts with the access command issued in response to the I/O request from the host device 202. Contention with the I/O request may affect I/O performance. Furthermore, since the CPU load increases during the diagnosis, there is a risk of affecting the I/O performance.

Therefore, the diagnosis unit 604 may set a lower priority (for example, Low) than the access command issued in response to the I/O request from the host device 202 in response for the diagnostic command. As a result, in the case of conflict with the I/O request, the access command issued in response to the I/O request may be prioritized.

In addition, the diagnosis unit 604 may set a diagnosis processing time T according to the size of the diagnosis area. Specifically, for example, in a case where the size of the diagnosis area is "100 GB", the diagnosis unit 604 sets the diagnosis processing time T to about "5 minutes". As a result, it is possible to restrict the time during which the new diagnosis processing is performed and suppress the influence on the I/O performance.

In addition, the diagnosis unit 604 may exclude the RAID group without redundancy and the RAID group under recovery processing from the diagnosis targets because the load is high and data recovery is in progress. In addition, in order not to frequently perform the new diagnosis processing for the diagnosis target disks, the storage control device 101 may limit the number of times to perform the processing on a day (for example, once a day).

In addition, the detection unit 603 detects an HDD having a response time measured by the diagnosis unit 604 equal to or larger than the threshold value β among the diagnosis target disks extracted by the diagnosis unit 604 as a potentially faulty disk. Even if a specified amount of access commands are issued so that the load does not exceed the threshold value α, accesses suddenly increase according to the I/O requests from the host device 202, and the diagnosis target disk may be in a high load status in some cases.

For this reason, for example, the detecting unit 603 may refer to the performance information table 220 to detect an HDD having a busy rate lower than the threshold value α and a response time equal to or larger than the threshold value β among the diagnosis target disks as a potentially faulty disk. As a result, it is possible to avoid the diagnosis target disk having degraded response due to a busy state being detected as a potentially faulty disk.

For example, the busy rate b4 of the HDD 4 extracted as the diagnosis target disk is set to "40%", and a response time t4 is set to "3 seconds". In this case, since the busy rate b4 of the HDD 4 is lower than the threshold value α and the response time t4 of the HDD 4 is equal to or larger than the threshold value β, the detection unit 603 detects the HDD 4 as a potentially faulty disk.

The restoration unit 605 performs redundant copy on the potentially faulty disk detected by the detection unit 603. The redundant copy is a process of performing data migration from the potentially faulty disk to the hot spare HS in the background and incorporating the hot spare HS after the data migration into the RAID group in place of the potentially faulty disk.

Specific processing contents of the redundant copy will be described later with reference to FIG. 7.

In addition, when the detected potentially faulty disk is a diagnosis target disk determined as not being accessed, redundancy is less urgent to implement compared to a potentially faulty disk being accessed. Therefore, when the detected potentially faulty disk is a diagnosis target disk determined as not being accessed, in a case where there are a plurality of hot spares HS, the restoration unit 605 may execute redundant copy on the potentially faulty disk.

Redundant Copy

Next, with reference to FIG. 7, specific processing contents of redundant copy to the potentially faulty disk will be described.

Figure 7:
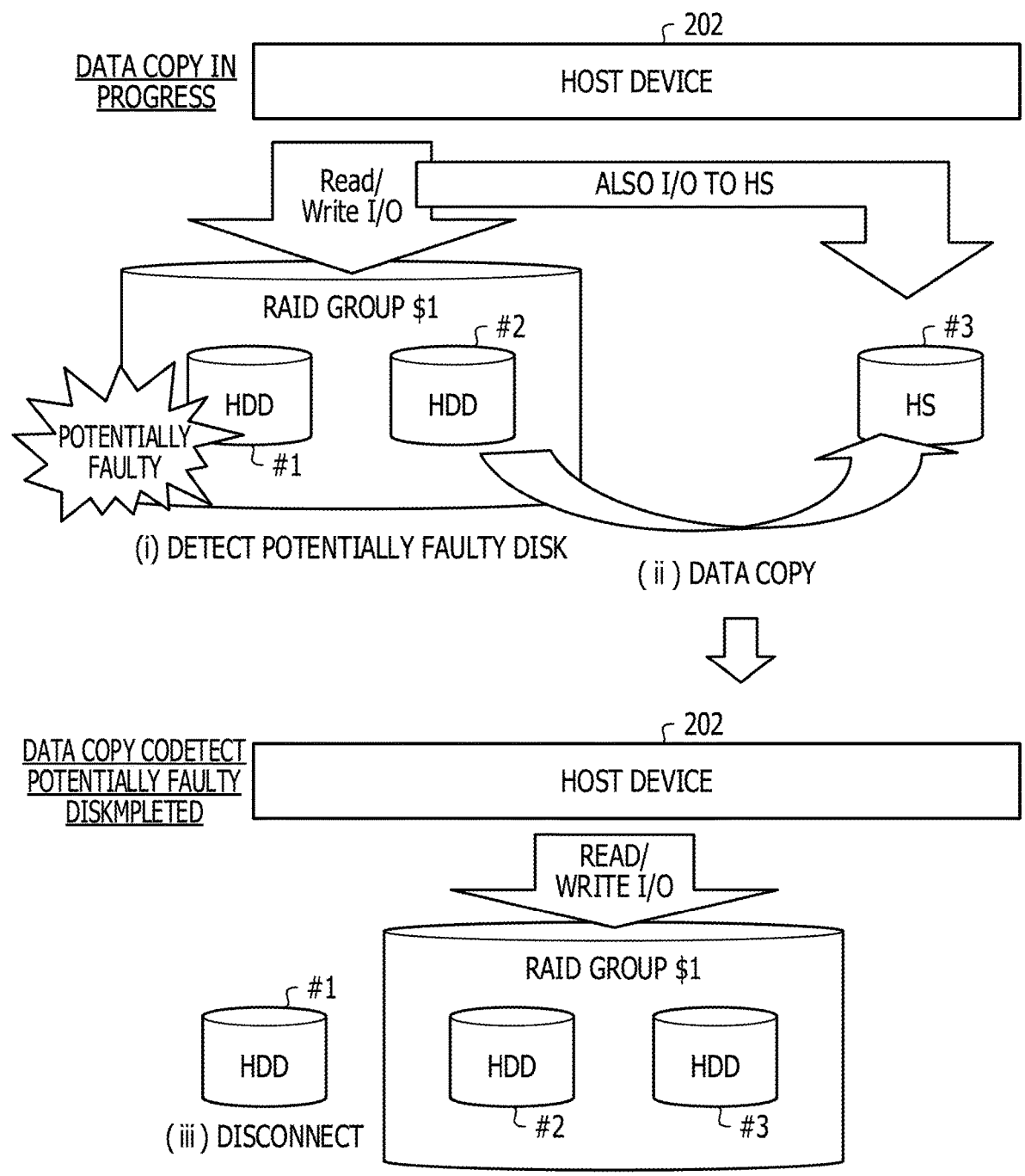
FIG. 7 is an explanatory diagram illustrating an example of specific processing contents of redundant copy.

FIG. 7 is an explanatory diagram illustrating an example of specific processing contents of redundant copy. In FIG. 7, it is assumed that an HDD #1 among HDDs #1 and #2 in a RAID group $1 is detected as a potentially faulty disk. In addition, here, it is assumed that data is duplicated in the HDDs #1 and #2.

(i) The storage control device 101 detects the HDD #1 as a potentially faulty disk. The HDD #1 is still in a usable state although the HDD #1 is detected as a potentially faulty disk. Therefore, an access to the HDD #1 accompanying the I/O request from the host device 202 is performed. However, a read request and data copy are performed mainly on the HDD #2 which is in the normal state.

(ii) The storage control device 101 copies data from the HDD #2 to a hot spare #3 in the background. This data copy corresponds to data migration from the HDD #1 to the hot spare #3. During the data copy, the access accompanying the I/O request from the host device 202 is also executed in the hot spare #3. That is, until the HDD #1 which is a potentially faulty disk is disconnected, the HDD #1 is operated in the state of data triplication. In a case where an error occurs when accessing the HDD #2, an access to the HDD #1 is performed by switching to the HDD #1.

(iii) When the data copy from the HDD #2 to the hot spare #3 in the background is completed, the storage control device 101 disconnect HDD #1 and incorporate the hot spare #3 into the RAID group $1. As a result, it is possible to disconnect the HDD #1 which is in a potential fault state while securing the data redundancy.

Various Control Processing Procedures of Storage Control Device 101

Next, various control processing procedures of the storage control device 101 will be described. In the following description, the timeout value for determining the I/O timeout in the statistical point addition processing or the patrol diagnosis processing is "5 seconds". In addition, the threshold value α is set to "50%", and the threshold value β is set to "2 seconds". In addition, "0%" is set as a busy rate for determining an HDD not being accessed.

First, with reference to FIGS. 8 and 9, the first potential fault detection processing procedure of the storage control device 101 will be described. The first potential fault detection processing is executed when an I/O request from the host device 202 is processed.

Figure 8:
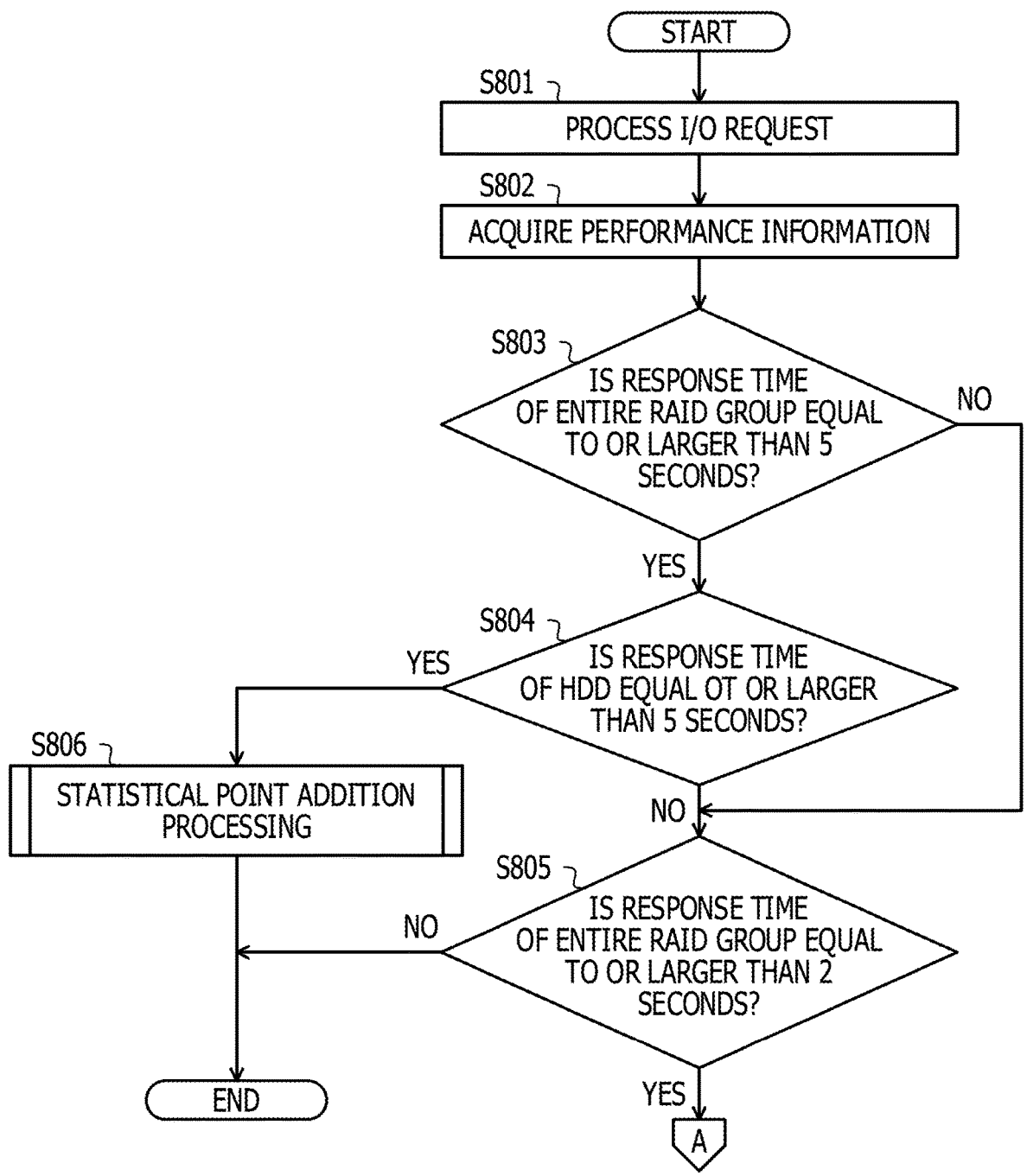
FIG. 8 is a flowchart (No. 1) illustrating an example of a first potential fault detection processing procedure of the storage control device.
Figure 9:
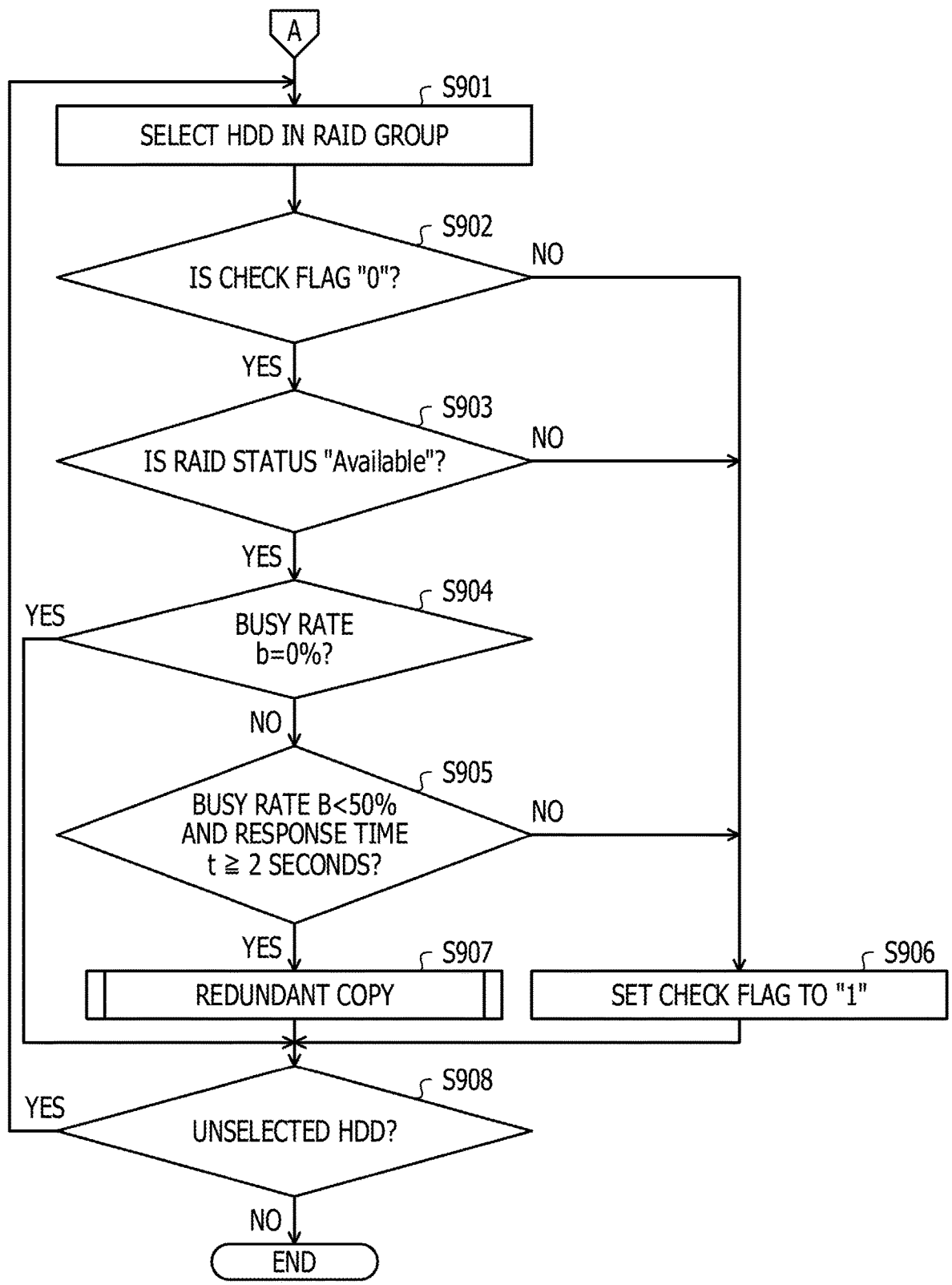
FIG. 9 is a flowchart (No. 2) illustrating an example of the first potential fault detection processing procedure of the storage control device.

FIGS. 8 and 9 are flowcharts illustrating examples of the first potential fault detection processing procedure of the storage control device 101. In the flowchart of FIG. 8, first, the storage control device 101 processes an I/O request from the host device 202 (step S801). The response to the I/O request to the host device 202 is appropriately performed.

Then, the storage control device 101 acquires the performance information representing the load status and the response status of the HDD in the storage ST (step S802). The acquired performance information is stored in the performance information table 220. Next, the storage control device 101 determines whether or not the response time of the entire RAID group accessed in response to the I/O request from the host device 202 is 5 seconds or more (step S803).

Here, in a case where the response time of the entire RAID group is less than 5 seconds (step S803: No), the storage control device 101 moves to step S805. On the other hand, in a case where the response time of the entire RAID group is 5 seconds or more (step S803: Yes), the storage control device 101 refers to the performance information table 220 to determine whether or not the response time of the HDD in the accessed RAID group is 5 seconds or more (step S804).

Here, in a case where the response time of the HDD is less than 5 seconds (step S804: No), the storage control device 101 determines whether or not the response time of the accessed entire RAID group is 2 seconds or more (step S805). Here, in a case where the response time of the entire RAID group is less than 2 seconds (step S805: No), the storage control device 101 ends a series of processes according to this flowchart.

On the other hand, in a case where the response time of the entire RAID group is 2 seconds or more (step S805: Yes), the storage control device 101 moves to step S901 illustrated in FIG. 9.

In addition, in step S804, in a case where the response time of the HDD is 5 seconds or more (step S804: Yes), the storage control device 101 executes the statistical point addition processing (step S806) and ends the series of processes according to this flowchart.

In the statistical point addition processing, points are added to the HDDs having 5 seconds or more response time among the HDDs in the accessed RAID group, and the HDDs having statistically added point value exceeding the threshold value are detected as suspected disks. For the HDDs detected as suspected disks, for example, redundant copy is executed.

In the flowchart of FIG. 9, first, the storage control device 101 selects an unselected HDD that is not selected among the HDDs in the accessed RAID group (step S901). Next, the storage control device 101 refers to the configuration table 230 to determine whether or not the check flag of the selected HDD is "0" (step S902).

Here, in a case where the check flag is not "0" (step S902: No), the storage control device 101 moves to step S906. On the other hand, in a case where the check flag is "0" (step S902: Yes), the storage control device 101 refers to the configuration table 230 to determine whether or not the RAID status of the accessed RAID group is "Available" (step S903).

Here, in a case where the RAID status is not "Available" (step S903: No), the storage control device 101 moves to step S906. On the other hand, in a case where the RAID status is "Available" (step S903: Yes), the storage control device 101 refers to the performance information table 220 to determine whether or not a busy rate b of the selected HDD is 0% (step S904).

Here, in a case where the busy rate is 0% (step S904: Yes), the storage control device 101 moves to step S908. On the other hand, in a case where the busy rate is not 0% (step S904: No), the storage control device 101 refers to the performance information table 220 to determine whether the busy rate b of the selected HDD is less than 50% and the response time t is 2 seconds or more (step S905).

Here, in a case where the busy rate b is less than 50% and the response time t is not equal to or larger than 2 seconds (step S905: No), the storage control device 101 sets "1" to the check flag of the selected HDD (step S906) and moves to step S908.

On the other hand, in a case where the busy rate b is less than 50% and the response time t is 2 seconds or more (step S905: Yes), the storage control device 101 executes redundant copy on the selected HDD (step S907). While redundant copy of the HDD is underway, the RAID status of the RAID group including the HDD is "Rebuild".

Then, the storage control device 101 determines whether or not there is an unselected HDD that is not selected among the HDDs in the accessed RAID group (step S908). Here, in a case where there is an unselected HDD (step S908: Yes), the storage control device 101 returns to step S901.

On the other hand, in a case where there is no unselected HDD (step S908: No), the storage control device 101 ends a series of processes according to this flowchart. As a result, although the response timeout (I/O timeout) has not occurred, it is possible to detect a potentially faulty disk and perform redundant copy.

In addition, it is possible to avoid erroneous detection of an HDD having degraded response due to a busy state as a potentially faulty disk. In addition, when the RAID group is being recovered or redundancy is lost, it is possible to control not to execute redundant copy on the potentially faulty disk. In addition, it is possible to extract the HDD (HDD with the check flag "0") determined as not being accessed as a diagnosis target disk.

Next, with reference to FIG. 10, a second potential fault detection processing procedure of the storage control device 101 will be described. The second potential fault detection processing is executed periodically (for example, every day at 24 o'clock) or at a predetermined timing (for example, timing specified by an administrator of the storage system 200).

Figure 10:
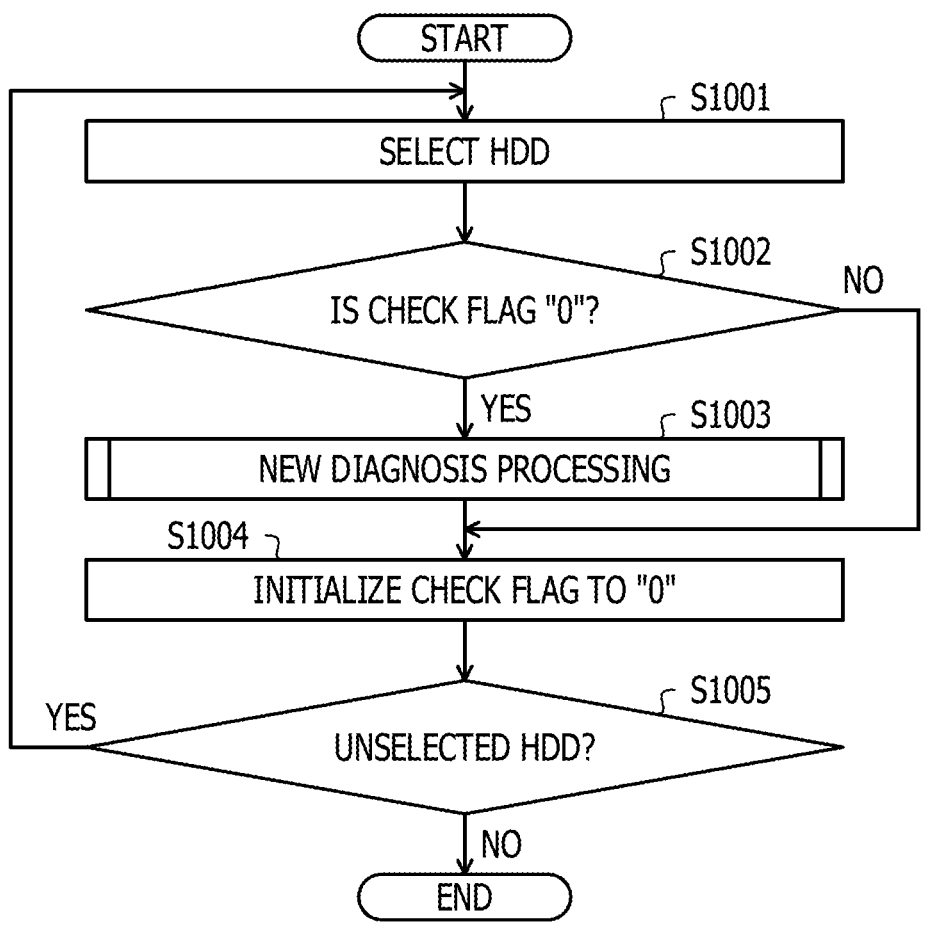
FIG. 10 is a flowchart illustrating an example of a second potential fault detection processing procedure of the storage control device.

FIG. 10 is a flowchart illustrating an example of the second potential fault detection processing procedure of the storage control device 101. In the flowchart of FIG. 10, first, the storage control device 101 selects an unselected HDD that is not selected among the HDDs in the storage ST (step S1001).

Next, the storage control device 101 refers to the configuration table 230 to determine whether or not the check flag of the selected HDD is "0" (step S1002). Here, in a case where the check flag is not "0" (step S1002: No), the storage control device 101 moves to step S1004.

On the other hand, in a case where the check flag is "0" (step S1002: Yes), the storage control device 101 executes new diagnosis processing (step S1003). A specific processing procedure of the new diagnosis processing will be described later with reference to FIG. 11. Then, the storage control device 101 initializes the check flag of the selected HDD with "0" (step S1004).

Next, the storage control device 101 determines whether or not there is an unselected HDD that is not selected among the HDDs in the storage ST (step S1005). Here, in a case where there is an unselected HDD (step S1005: Yes), the storage control device 101 returns to step S1001.

On the other hand, in a case where there is no unselected HDD (step S1005: No), the storage control device 101 ends a series of processes according to this flowchart. As a result, it is possible to execute the new diagnosis processing on the diagnosis target disk (the HDD with the check flag "0") in the storage ST.

Next, with reference to FIG. 11, a specific processing procedure of the new diagnosis processing in step S1003 in FIG. 10 will be described.

Figure 11:
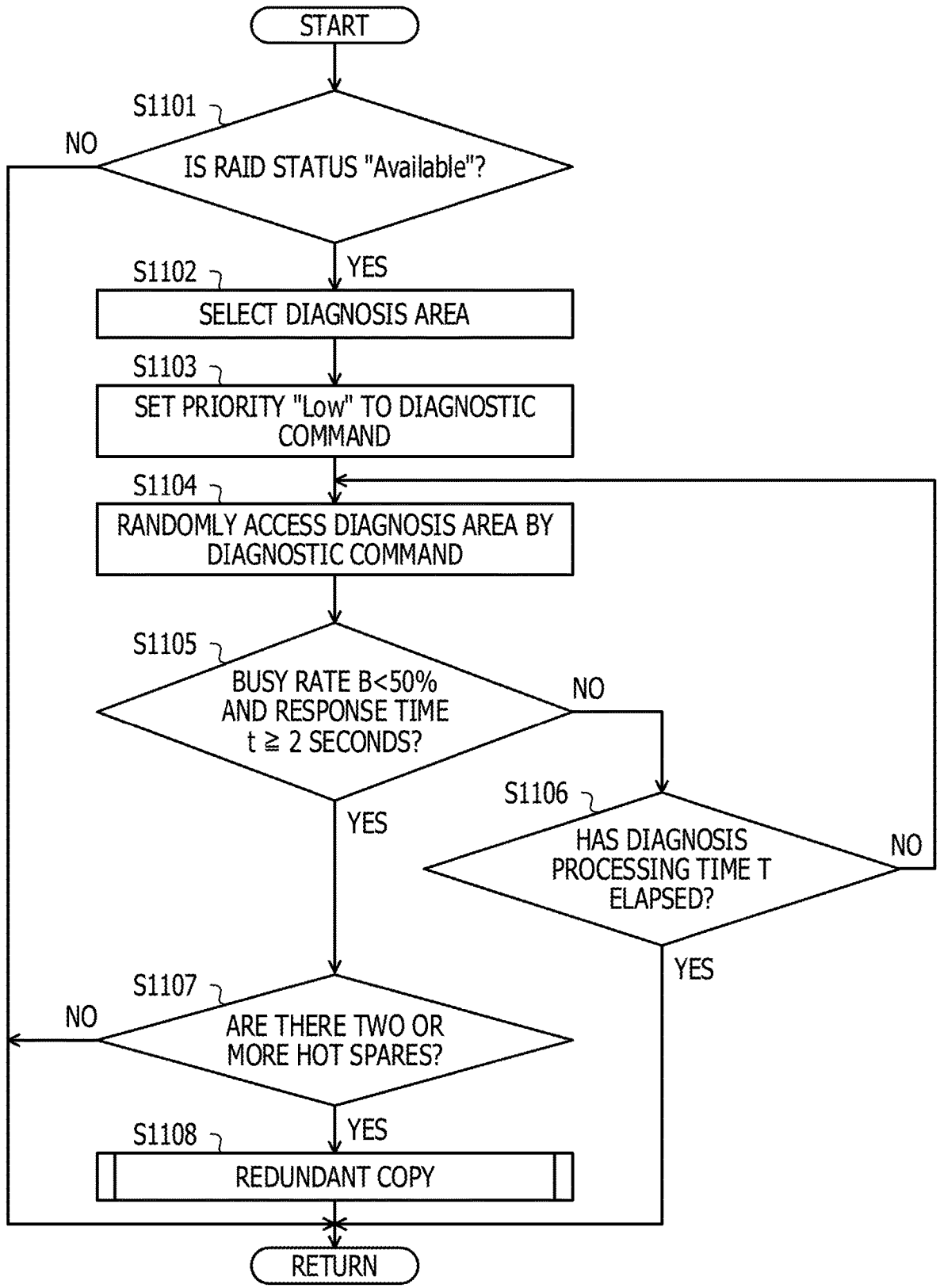
FIG. 11 is a flowchart illustrating an example of a specific processing procedure of new diagnosis processing.

FIG. 11 is a flowchart illustrating an example of a specific processing procedure of the new diagnosis processing. In the flowchart of FIG. 11, first, the storage control device 101 refers to the configuration table 230 to determine whether or not the RAID status of the RAID group including the diagnosis target disk is "Available" (step S1101). The diagnosis target disk is the HDD selected in step S1001 of FIG. 10.

Here, in a case where the RAID status is not "Available" (step S1101: No), the storage control device 101 returns to the step which is called the new diagnosis processing. On the other hand, in a case where the RAID status is "Available" (step S1101: Yes), the storage control device 101 selects an area other than the patrol diagnosed area out of the diagnosis target disks as a diagnosis area (step S1102).

Next, the storage control device 101 sets the priority "Low" to the diagnostic command (read/write command) (step S1103). Then, the storage control device 101 randomly accesses the selected diagnosis area by a specified amount of diagnostic commands (step S1104). At this time, the storage control device 101 measures the response time at the time of issuing the specified amount of diagnostic commands and stores the performance information in the performance information table 220.

Next, the storage control device 101 refers to the performance information table 220 to determine whether or not the busy rate b of the diagnosis target disk is less than 50% and the response time t is 2 seconds or more (step S1105).

Here, when the busy rate b is less than 50% and the response time t is not equal to or larger than 2 seconds (step S1105: No), the storage control device 101 determines whether or not the diagnosis processing time T has elapsed since the random access to the diagnostic area was started (step S1106).

Here, in a case where the diagnosis processing time T has not elapsed (step S1106: No), the storage control device 101 returns to step S1104. On the other hand, in a case where the diagnosis processing time T has elapsed (step S1106: Yes), the storage control device 101 returns to the step which is called the new diagnosis processing.

In addition, in step S1105, in a case where the busy rate b is less than 50% and the response time t is 2 seconds or more (step S1105: Yes), the storage control device 101 determines whether or not there are two or more hot spare HSs (step S1107). Here, in a case where there are no more than two hot spares HS (step S1107: No), the storage control device 101 returns to the step which is called the new diagnosis processing.

On the other hand, in a case where there are two or more hot spares HS (step S1107: Yes), the storage control device 101 executes redundant copy on the diagnosis target disk (potentially faulty disk) (step S1108) and returns to the step which is called the new diagnosis processing.

As a result, it is possible to detect an HDD in a potential fault state among the diagnosis target disks determined as not being accessed to execute redundant copy. In addition, it is possible to control so that new diagnosis processing is not executed when the RAID group is being recovered or redundancy is lost.

As described above, according to the storage control device 101 of the embodiment, It is possible to acquire the performance information representing the load status and the response status of the HDD in the storage ST accessed in response to the I/O request from the host device 202. Then, according to the storage control device 101, based on the acquired performance information, it is possible to detect an HDD having load lower than the threshold value α and response time equal to or larger than the threshold value β among the HDDs in the storage ST as a potentially faulty disk.

As a result, although the response timeout (I/O timeout) has not occurred, it is possible to detect a potentially faulty disk that is slowing down. In addition, since not only the response time but also the load is taken into consideration, it is possible to avoid erroneous detection of an HDD having degraded response due to a busy state as a potentially faulty disk.

In addition, according to the storage control device 101, it is possible to extract an HDD determined as not being accessed as a diagnosis target disk among the HDDs in the storage ST based on the performance information. In addition, according to the storage control device 101, it is possible to measure the response time when the specified amount of diagnostic commands are issued so that the load does not exceed the threshold value β for the extracted diagnosis target disks. Then, according to the storage control device 101, it is possible to detect an HDD having the measured response time equal to or larger than the threshold value β as a potentially faulty disk among the extracted diagnosis target disks.

As a result, even for HDDs which have not been accessed or hardly accessed, it is possible to detect a potentially faulty disk that is slowing down by issuing a diagnostic command asynchronously with the I/O request from the host device 202 and diagnosing the performance.

In addition, according to the storage control device 101, it is possible to execute redundant copy on the detected potentially faulty disk. As a result, it is possible to automatically perform recovery processing of disconnecting the HDD in the potential fault state while securing the data redundancy, thereby suppressing the degradation of the response performance of the entire RAID group due to the influence of the performance degradation of the HDD which is in a potential fault state.

In addition, according to the storage control device 101, when the detected potentially faulty disk is a diagnosis target disk which is determined as not being accessed, in a case where there are two or more hot spares HS, it is possible to execute redundant copy on the potentially faulty disk.

As a result, when the potentially faulty disk is a disk to be diagnosed which is determined as not accessed, in a case where there are a plurality of hot spares HS, it is possible to execute redundant copy. Therefore, it is possible to reduce the possibility of occurrence of an event in which there is no hot spare HS when executing redundant copy on a potentially faulty disk that is being accessed frequently.

In addition, according to the storage control device 101, it is possible to set a lower priority than the access command issued in response to the I/O request from the host device 202 to a diagnostic command. As a result, in the case of conflict with the I/O request from the host device 202, it is possible to process the access command issued in response to the I/O request in preference to a diagnostic command, thereby suppressing the influence on the I/O performance.

From these facts, according to the storage control device 101 of the embodiment, although a response timeout or a medium error has not occurred, it is possible discover the HDD slowing down in a potential fault state at an early stage. In addition, it is possible to suppress the degradation of the response performance of the entire RAID group due to the performance degradation of the HDD in a potential fault state by automatic recovery processing using redundant copy.

The control method described in the present embodiment may be realized by executing a program prepared in advance by a computer such as a storage control device or the like. This control program is recorded in a computer-readable recording medium such as a hard disk, a flexible disk, a compact disc (CD)-ROM, a magneto-optical (MO) disk, a digital versatile disk (DVD), a Universal Serial Bus (USB) memory and is executed by being read from the medium. In addition, this control program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device comprising:
circuitry configured to:
acquire status information indicating a load status and a response status of each of one or more storage devices from the one or more storage devices which are accessed in response to a request transmitted from a host device,
detect a first storage device having a load no more than a first threshold value and a response time no less than a second threshold value from the one or more storage devices on the basis of the acquired status information,
execute redundant copy of the detected first storage device, detect, from the one or more storage devices, a second storage device that is not accessed in response to a response transmitted from the host device on the basis of the status information, measure a response time of the detected second storage device when an access command is issued for the second storage device on condition that a load of the second storage device does not exceed the first threshold value, and determine whether the measured response time of the second storage device is no less than the second threshold value.

2. The storage control device according to claim 1, the circuitry further configured to execute redundant copy of the second storage device in a case where the response time of the second storage device is no less than the second threshold value.

3. The storage control device according to claim 2, wherein the redundant copy of the second storage device is executed in a case where there is a plurality of alternative storage devices to which copies are to be generated.

4. The storage control device according to claim 1, wherein a priority lower than a priority of another access command issued in response to a request transmitted from the host device is set in the access command.

5. The storage control device according to claim 1, wherein the second threshold value is lower than a timeout value for each of the one or more storage devices.

6. The storage control device according to claim 1, wherein the load status of each of the one or more storage devices is represented by a busy rate.

7. A computer-implemented storage control method comprising:

acquiring status information indicating a load status and a response status of each of one or more storage devices from the one or more storage devices which are accessed in response to a request transmitted from a host device;

detecting a first storage device having a load no more than a first threshold value and a response time no less than a second threshold value from the one or more storage devices on the basis of the acquired status information;

executing redundant copy of the detected first storage device, detecting, from the one or more storage devices, a second storage device that is not accessed in response to a response transmitted from the host device on the basis of the status information;

measuring a response time of the detected second storage device when an access command is issued for the second storage device on condition that a load of the second storage device does not exceed the first threshold value; and determining whether the measured response time of the second storage device is no less than the second threshold value.

8. The storage control method according to claim 7, further comprising:

executing redundant copy of the second storage device in a case where the response time of the second storage device is no less than the second threshold value.

9. The storage control method according to claim 8, wherein the redundant copy of the second storage device is executed in a case where there is a plurality of alternative storage devices to which copies are to be generated.

10. The storage control method according to claim 7, wherein a priority lower than a priority of another access command issued in response to a request transmitted from the host device is set in the access command.

11. The storage control method according to claim 7, wherein the second threshold value is lower than a timeout value for each of the one or more storage devices.

12. The storage control method according to claim 7, wherein the load status of each of the one or more storage devices is represented by a busy rate.

13. A non-transitory computer-readable medium storing a storage control program that causes a computer to execute a process comprising:

acquiring status information indicating a load status and a response status of each of one or more storage devices from the one or more storage devices which are accessed in response to a request transmitted from a host device;

detecting a first storage device having a load no more than a first threshold value and a response time no less than a second threshold value from the one or more storage devices on the basis of the acquired status information;

executing redundant copy of the detected first storage device, detecting, from the one or more storage devices, a second storage device that is not accessed in response to a response transmitted from the host device on the basis of the status information;

measuring a response time of the detected second storage device when an access command is issued for the second storage device on condition that a load of the second storage device does not exceed the first threshold value; and determining whether the measured response time of the second storage device is no less than the second threshold value.

* * * * *